July 8, 1941.   F. C. G. RICHARDSON   2,248,386
FOUNTAIN
Filed Dec. 8, 1939

Francis C. G. Richardson   INVENTOR.
BY F. K. Caswell
ATTORNEY.

Patented July 8, 1941

2,248,386

UNITED STATES PATENT OFFICE 2,248,386

FOUNTAIN

Francis C. G. Richardson, Alhambra, Calif.

Application December 8, 1939, Serial No. 308,204

6 Claims. (Cl. 299—2)

My invention relates to that class of fountains particularly adapted to be used in connection with fish ponds or lily ponds and ornamental pools such as are commonly found in gardens, patios and parks. Heretofore fountains designed for this purpose have usually been rigidly located and supported and are provided with a single nozzle through which all of the water used is that obtained under pressure from the incoming supply of water. This results in a considerable amount of water being introduced into the pond, and in turn necessitates an overflow pipe which very commonly become easily clogged.

The purposes of my invention are: (1) To provide a fountain which will produce an upwardly projected primary column of water and one which is so designed and arranged that a secondary water column is lifted and blended with the primary column. (2) To provide a fountain device which can be easily and quickly installed by the use of common household tools. (3) To provide a fountain device having so little water consumption that the fountain can be used for several hours without materially changing the level of the pond water. (4) To provide a fountain which does not require a constant level of water in the pond. (5) To provide a fountain device which can be attached to a source of water supply by means of a flexible tube of rubber or other resilient material. (6) To provide a device which produces a spray consisting of water from a pressure supply source, combined with pond water lifted by the velocity and friction of the pressure-actuated water emerging from a submerged nozzle and passing through a layer of the pond water. (7) to aerate and circulate the pond water, the oxygenation and purification thereby engendered tending to destroy scum and algae, clarify the pond water, all of which results in a healthier condition for fish and, of course, plants. (8) To provide a fountain device which will operate with any depth of water without any special adjustment being required for different depths. (9) To provide the device with means for regulating the height of the principal spray. (10) To provide a float supporting a submerged nozzle. (11) To provide a ring-shaped float of sufficient diameter that a large portion of the spray falls into the water inside the float, causing the float to bob and thus vary the height of the spray. (12) To provide a means for regulating the pressure of the water from the supply source which also regulates the force of the jet from the nozzle.

Figure 1:
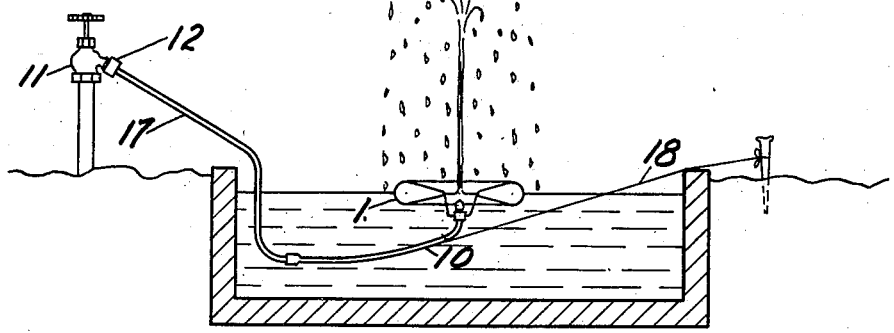
Figure 2:
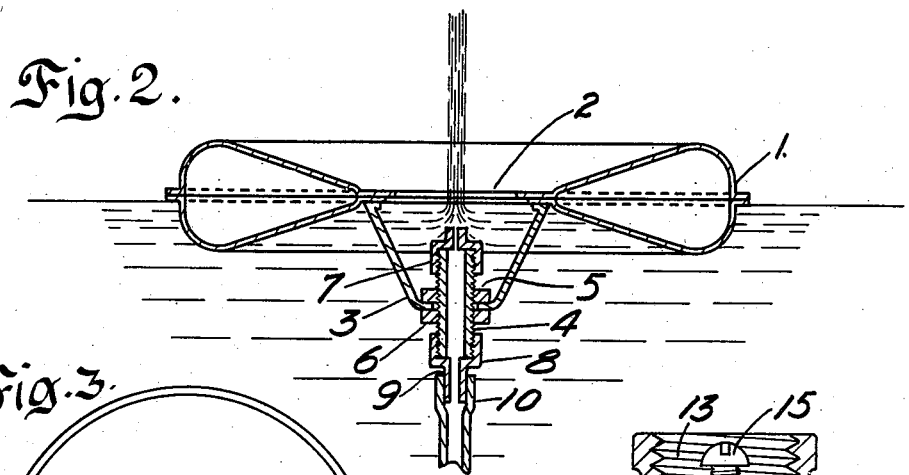
Figure 3:
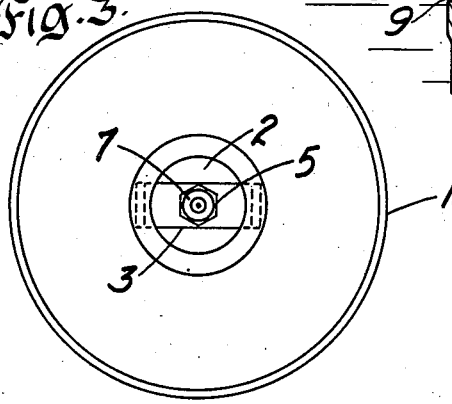
Figure 4:
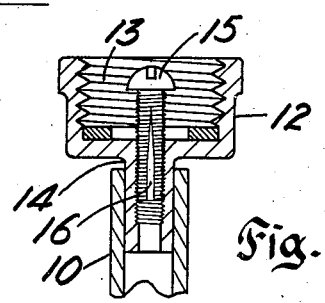

I accomplish these objects by means of the mechanism shown in the accompanying drawing in which similar numerals refer to similar parts in the several views. Figure 1 is a vertical central section through a preferred form of my device and the pond. Figure 2 is an enlarged side elevation, in section, of the float and nozzle. Figure 3 is a plan view of the float and nozzle. Figure 4 is an enlarged section of the faucet attachment showing the regulating screw.

The construction of my device is as follows: 1 is a hollow float, preferably circular in form and having a relatively large circular opening 2 in the center thereof and having a bracket 3 attached thereto. Centrally located in the base of the bracket 3 is a threaded tube 4 vertically adjustable by means of the lock nuts 5 and 6, or by other suitable means. Attached to the upper end of the tube 4 by a screw thread is a nozzle 7. Secured to the lower end of the tube 4 by means of a screw thread is a coupling 8 having a stem 9 to which is connected a flexible hose 10, said hose being connected at its outer extremity to a faucet 11 or other source of water supply. The regulating coupling 12 may be connected directly to a faucet 11 or to a metal pipe 17, this pipe being preferably made of copper. If it is desired to partially determine and hold the location of the float, same may be accomplished by a cord such as 18.

One means by which the hose 10 is connected to the water supply and by which the quantity and pressure of water is regulated, consists of a cylindrical member 12 having an interior thread 13 and a stem 14 which is adapted to be secured to the hose 10.

The regulatory feature consists of a small screw 15 tapped into the opening through the stem 14 and having a tapered slot 16 cut in the side of the said screw 15 so that, as the screw is screwed in or out of position, the opening diminishes or increases in size, thus allowing the passage of more or less water.

The operation of my device is as follows: The float 1 is placed on the surface of the water and the rubber hose 10, or its equivalent, is connected to a source of water supply 11. The tube 4, carrying with it the nozzle 7, is adjusted so that the opening in the said nozzle is below the surface of the water in the pond. The distance between the surface of the water and the nozzle 7 may be varied to suit the water pressure, but the desired results are commonly obtained with one-quarter inch submersions. The screw 15 is adjusted to suit the pressure from the source of water supply and thus regulates the height of the spray, from the nozzle. When the faucet 11 is open, water from the domestic water system leaves the nozzle 7 at high velocity, and the water is projected into the air to an adjustable distance above the surface of the pond. In passing through the layer of pond water between the nozzle 7 and the surface of the pond, the water under pressure picks up and projects into the air an amount of pond water several times greater than the amount of water issuing from the nozzle itself. The combination of water from both sources falls back, partly on the fountain device, causing a variation in the thickness of pond water between the nozzle 7 and the normal water surface. This causes a varying height of the column of water above the pond surface, creating a pleasing bubbling movement and adding to the desirable splashing noise of the falling water, the variation being enhanced by the natural bobbing of the supporting float 1 in the pond water. The bubbling movement and action is much enhanced by use of a circular float which tends to collect and concentrate the water falling back from the fountain, over and above the nozzle 7.

Various changes may be made in the construction of my device; for example, the float may be made of hollow metal, as shown, or it may be made of cork or other material having a specific gravity less than that of water. Other means for regulating the water pressure may also be used, such as having the screw 15 tapped into a tube with openings on the side of said tube, one or more of these openings being uncovered as the screw is withdrawn. The nozzle 7 can have more than one jet orifice and more than one set can be used with one float assembly, projecting fountain sprays in the same or in varying directions, to produce an unlimited number of display effects.

What I claim as my invention and desire to secure by Letters Patent is:

1. In a device of the class described, the combination of a float having a central opening, a downwardly projecting bracket attached to said float; a vertical nozzle mounted on said bracket; means for attaching said nozzle to a source of water supply; and also means for vertically adjusting the said nozzle to a desired distance below the water line when the said float is partially submerged.

2. In a device of the class described, the combination of a float having a central opening; a downwardly projecting bracket attached to said float; a vertical nozzle mounted on said bracket; means for attaching said nozzle to a source of water supply; means for regulating the pressure of said water supply; and also means for vertically adjusting the said nozzle to a desired distance below the water line when the said float is partially submerged.

3. In a device of the class described, the combination of a hollow ring-shaped member adapted to float on water and having a bracket attached to and below said member; a vertical nozzle mounted on said bracket; flexible tubular means for attaching said nozzle to a source of water supply; means for vertically adjusting the said nozzle to a desired distance below the water line when said ring-shaped member is partially submerged; means for regulating the pressure of said water supply, said means consisting of a coupling connected to said tubular means and adapted to be screwed onto said source of water supply, and having a screw located in the opening for said water supply and a tapering slot longitudinally cut in said screw to obtain a variable water opening as the said screw is adjusted.

4. In a device of the class described, means for projecting upwardly a primary jet of water from a submerged nozzle and for simultaneously producing a secondary spray of water, said secondary spray being induced by the friction of the rapidly moving primary jet of water passing through the water above the said submerged nozzle, said means consisting of a float having a central opening, a downwardly projecting bracket attached to said float, a vertical nozzle mounted on said bracket, flexible means for attaching said nozzle to a source of water supply, and also means for vertically adjusting the said nozzle to a desired distance below the water line when the said float is partially submerged.

5. In a device of the class described, means for projecting upwardly a primary jet of water from a submerged nozzle and for simultaneously producing a secondary spray of water, said secondary spray being induced by the friction of the rapidly moving primary jet of water passing through the water above the said submerged nozzle, said means consisting of a hollow ring-shaped member adapted to float on water and having a bracket attached to and below said member, a vertical nozzle mounted on said bracket, flexible tubular means for attaching said nozzle to a source of water supply, means for vertically adjusting said nozzle to a desired distance below the water line when said ring-shaped member is partially submerged; means for regulating the pressure of said water supply, said means consisting of a coupling connected to said tubular means and adapted to be screwed onto said source of water supply and having a screw located in the opening of the coupling and a tapering slot longitudinally cut in said screw to obtain a variable water opening as the said screw is adjusted.

6. In a device of the class described, means for projecting upwardly a primary jet of water from a submerged nozzle and for simultaneously producing a secondary spray of water, said secondary spray being induced by the friction of the rapidly moving primary jet of water passing through the water above the said submerged nozzle, said means consisting of a float having a funnel-shaped central opening adapted to collect most of the water falling from the sprays and for the purpose of agitating the water adjacent to said float and also for the purpose of rocking said float and varying the action of the said sprays; a downwardly projecting bracket attached to said float, a vertical nozzle mounted on said bracket; flexible means for attaching said nozzle to a source of water supply, and also means for vertically adjusting the said nozzle to a desired distance below the water line when the said float is partially submerged.

FRANCIS C. G. RICHARDSON.